(12) United States Patent
Kong et al.

(10) Patent No.: US 10,698,252 B2
(45) Date of Patent: Jun. 30, 2020

(54) DISPLAY DEVICE AND METHOD OF MANUFACTURING THE SAME

(71) Applicant: LG DISPLAY CO., LTD., Seoul (KR)

(72) Inventors: Chang Kyeong Kong, Paju-si (KR);
Young Min Kweon, Paju-si (KR);
Hyun Cheol Cho, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/662,062

(22) Filed: Jul. 27, 2017

(65) Prior Publication Data

US 2018/0031925 A1 Feb. 1, 2018

(30) Foreign Application Priority Data

Jul. 29, 2016 (KR) ........................ 10-2016-0097512

(51) Int. Cl.
*G02F 1/1335* (2006.01)
*F21V 8/00* (2006.01)
(Continued)

(52) U.S. Cl.
CPC ....... *G02F 1/133524* (2013.01); *G02B 6/005* (2013.01); *G02B 6/0011* (2013.01); *G02B 6/0036* (2013.01); *G02F 1/133528* (2013.01); *G02F 1/133615* (2013.01); *G02F 1/1339* (2013.01); *G02F 1/136286* (2013.01); *G02F 2001/133368* (2013.01); *G02F 2001/133565* (2013.01); *G02F 2001/136222* (2013.01);
(Continued)

(58) Field of Classification Search
CPC ... G02F 1/133615; G02F 2001/136222; G02F 2001/133302; G02F 2001/133368; G02F 1/33345; G02F 1/133605; G02F 1/133528; G02F 2201/56; G02B 6/0011; G02B 6/0036; G02B 6/005
See application file for complete search history.

(56) References Cited

U.S. PATENT DOCUMENTS 6,734,934 B2 * 5/2004 Yoshii ............... G02F 1/133615
349/113
7,468,764 B2 * 12/2008 Fukushima ............ G02B 6/005
349/67
(Continued)

FOREIGN PATENT DOCUMENTS

CN 1930515 A 3/2007
CN 101021648 A 8/2007
(Continued)

*Primary Examiner* — Paisley L Wilson
(74) *Attorney, Agent, or Firm* — Seed Intellectual Property Law Group LLP

(57) ABSTRACT

In various embodiments, the present disclosure provides display devices and methods of manufacturing display devices that can be slimmer than typical display devices. In one embodiment, such a display device includes a first substrate formed of glass, a light source disposed at a position that corresponds to at least one surface of the first substrate, a first resin layer on the first substrate, a first polarizing layer on the first resin layer, a liquid crystal layer on the first polarizing layer, a second substrate on the liquid crystal layer, the second substrate including a plurality of data lines and a plurality of gate lines, and a second polarizing layer on the second substrate.

17 Claims, 10 Drawing Sheets

(51) Int. Cl.
*G02F 1/13357* (2006.01)
*G02F 1/1333* (2006.01)
*G02F 1/1362* (2006.01)
*G02F 1/1339* (2006.01)

(52) U.S. Cl.
CPC ...... *G02F 2201/56* (2013.01); *G02F 2202/28* (2013.01); *G02F 2202/36* (2013.01)

(56) References Cited

U.S. PATENT DOCUMENTS

| | | | | |
|---|---|---|---|---|
| 8,314,819 | B2* | 11/2012 | Kimmel | G02B 6/0036 345/102 |
| 10,067,375 | B2* | 9/2018 | Yoon | G02F 1/1333 |
| 10,222,652 | B2 | 3/2019 | Chen | |
| 2003/0128318 | A1 | 7/2003 | Yoshii et al. | |
| 2003/0218701 | A1* | 11/2003 | Kawakami | G02B 6/0061 349/65 |
| 2007/0242185 | A1 | 10/2007 | Fukushima et al. | |
| 2008/0252825 | A1* | 10/2008 | Kim | B82Y 20/00 349/96 |
| 2009/0052029 | A1* | 2/2009 | Dai | B82Y 20/00 359/485.02 |
| 2011/0187967 | A1* | 8/2011 | Shinohara | G02B 6/0016 349/65 |
| 2012/0268687 | A1* | 10/2012 | Kaida | B29D 11/00663 349/61 |
| 2013/0236680 | A1 | 9/2013 | Ahn et al. | |
| 2015/0323831 | A1* | 11/2015 | Yang | G02F 1/1368 349/61 |
| 2016/0054511 | A1 | 2/2016 | Zhang et al. | |
| 2017/0351149 | A1* | 12/2017 | Chu | G02F 1/133345 |
| 2018/0046018 | A1 | 2/2018 | Chen et al. | |
| 2018/0101067 | A1 | 4/2018 | Chen et al. | |

FOREIGN PATENT DOCUMENTS

| | | |
|---|---|---|
| CN | 103310708 A | 9/2013 |
| CN | 103676276 A | 3/2014 |
| CN | 105629547 A | 6/2016 |
| CN | 105785638 A | 7/2016 |
| CN | 105785665 A | 7/2016 |
| KR | 10-0793065 B1 | 1/2008 |

* cited by examiner

DISPLAY DEVICE AND METHOD OF MANUFACTURING THE SAME

CROSS REFERENCE TO RELATED APPLICATION

This application claims priority from Korean Patent Application No. 10-2016-0097512, filed on Jul. 29, 2016, which is hereby incorporated by reference for all purposes as if fully set forth herein.

BACKGROUND

Technical Field

The present disclosure is generally directed to display devices and methods of manufacturing display devices, and more particularly, to display devices and methods of manufacturing display devices that have a substrate positioned between low-refractive index resin layers.

Description of the Related Art

In general, a Liquid Crystal Display (LCD) device is a type of flat panel display that displays images using the electrical and optical characteristics of a liquid crystal layer having intermediate properties between those of a liquid and a solid. Since the LCD device is thin and light compared to other display devices and the power consumption and driving voltage of the LCD device are low, the LCD device is widely used in various industries.

Meanwhile, because the liquid crystal layer of an LCD device is a non-luminescent element that emits light due to an external factor, the LCD device requires a separate light source. Accordingly, a backlight unit having a light source is provided on the rear surface of the liquid crystal panel, and emits light toward the front of the liquid crystal display device. The light is diffused while passing through a plurality of optical sheets, and converges on the liquid crystal panel, thereby being implemented as an image that can be identified.

In general, the backlight unit of an LCD device is classified into an edge-type backlight unit or a direct-type backlight unit depending on the arrangement of a light emitting lamp used as a light source.

The direct-type backlight unit includes a plurality of lamps, which are arranged in one or more rows on the rear surface of a liquid crystal panel and directly emit light onto the front surface of the liquid crystal panel. The edge-type backlight unit includes a light source that is provided outside of a light guide plate that guides light, and the light emitted from the light source is incident on the entire surface of the liquid crystal panel using the light guide plate.

However, in a general edge-type backlight unit, light emitted from a light emitting diode is supplied to the liquid crystal display panel as a planar light source via a side surface of the light guide plate, which causes a large optical loss.

In addition, the backlight unit includes components, such as a cover bottom, a reflection layer, a light source assembly, a light guide plate, a plurality of optical sheets, a guide panel, and a support main. Since the backlight unit includes a large number of components as described above, there are problems in that it is necessary to design and maintain mold mating performance between the respective components, and thus the degree of freedom of a product is limited. In addition, since inherent thicknesses exist for each of the respective components of the backlight unit, there is a problem in making the backlight unit slim.

BRIEF SUMMARY

Embodiments disclosed herein have been made in order to solve the above-described problems. The embodiments provide a display device that can be made slim by simplifying the structures of a backlight unit and a display panel, and also provide a method of manufacturing the display device.

In at least one embodiment, a display device is provided that includes a first substrate formed of glass. A light source is disposed in a region that corresponds to at least one surface of the first substrate. A first resin layer is disposed on the first substrate. A first polarizing layer is disposed on the first resin layer. A liquid crystal layer is disposed on the first polarizing layer. A second substrate is disposed on the liquid crystal layer, and the second substrate includes a plurality of data lines and a plurality of gate lines. A second polarizing layer is disposed on the second substrate.

In another embodiment, the present disclosure provides a method of manufacturing a display device that includes providing a first substrate formed of glass; disposing a light source adjacent to at least one surface of the first substrate; forming a first resin layer on the first substrate; and attaching a display panel on the first resin layer.

In another embodiment, the present disclosure provides a display device that includes a first substrate of a transparent material, the first substrate having a light-emitting surface and a plurality of side surfaces. A light source is positioned adjacent to at least one of the side surfaces of the first substrate. A first resin layer is provided on the light-emitting surface of the first substrate, and a second resin layer is provided on a surface of the first substrate that is opposite to the light-emitting surface. Each of the first and the second resin layers have an index of refraction that is less than an index of refraction of the first substrate.

A display device and a method of manufacturing the display device according to the present embodiments can make a display device slim since at least one substrate and a plurality of optical sheets of a light guide plate or a display panel are not needed, as compared to conventional display devices.

BRIEF DESCRIPTION OF THE SEVERAL VIEWS OF THE DRAWINGS

The above and other objects, features and advantages of the present disclosure will be more apparent from the following detailed description taken in conjunction with the accompanying drawings, in which.

DETAILED DESCRIPTION

Figure 1:
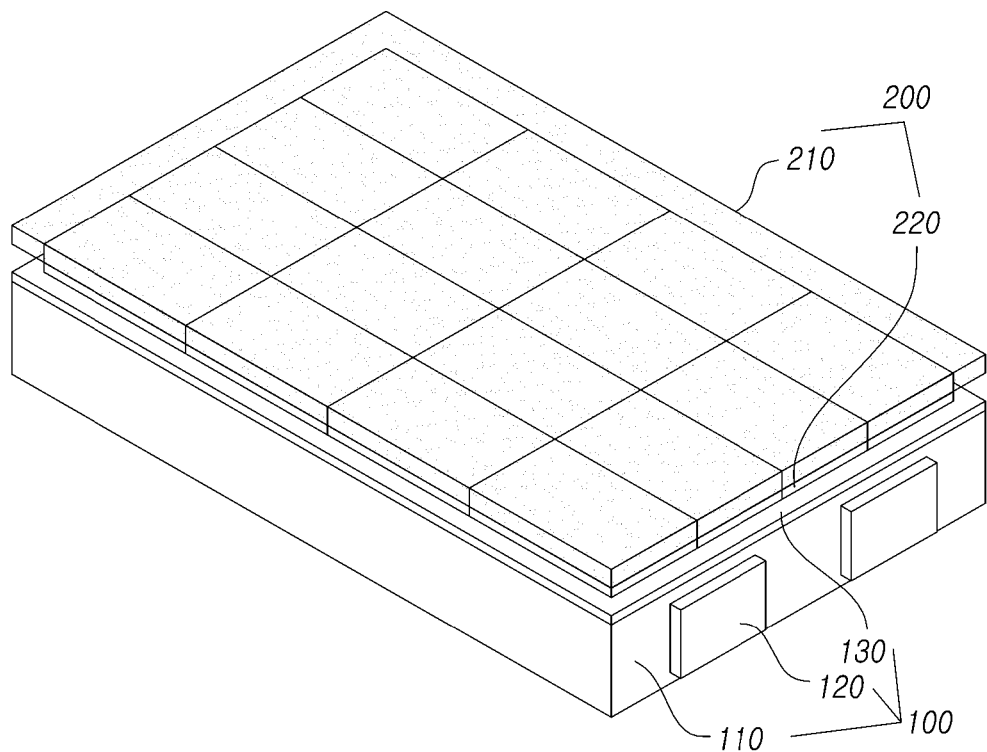
FIG. 1 is a perspective view schematically illustrating a display device according to one or more embodiments of the present disclosure.

Hereinafter, embodiments of the present disclosure will be described in detail with reference to the accompanying drawings. The following embodiments are provided, by way of example, so that the ideas of the present disclosure can be sufficiently understood by those skilled in the relevant art. Therefore, the present disclosure is not limited to the embodiments as described below, and may be embodied in other forms. Also, in the drawings, the size, thickness, and the like of a device or component may be exaggeratedly represented for the convenience of description. Throughout the specification, the same reference numerals may be used to designate the same elements.

The advantages and features of the present disclosure and methods of achieving the same will be apparent by referring to the various embodiments of the present disclosure as described below in detail in conjunction with the accompanying drawings. However, the present disclosure is not limited to the particular embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals may designate the same or like elements. In the drawings, the dimensions and relative sizes of layers and regions may be exaggerated for the convenience of description.

When an element or layer is referred to as being "above" or "on" another element, it can be "directly above" or "directly on" the other element or layer or intervening elements or layers may be present. In contrast, when an element is referred to as being "directly on" or "directly above" another element or layer, there are no intervening elements or layers present.

Spatially relative terms, such as "below", "beneath", "lower", "above", "upper" and the like, may be used herein for ease of description to describe one element or feature's relationship to another element(s) or feature(s) as illustrated in the figures. It will be understood that the spatially relative terms are intended to encompass different orientations of the element in use or operation in addition to the orientation depicted in the figures. For example, if the element in the figures is turned over, elements described as "below" or "beneath" other elements would then be oriented "above" the other elements. Thus, the exemplary term "below" can encompass both an orientation of above and below.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

The terms as used herein are merely for the purpose of describing embodiments and are not intended to limit the present disclosure. As used herein, singular forms are intended to include plural forms unless the context clearly indicates otherwise. The terms "comprises" and/or "comprising" as used herein refer to the existence of a disclosed component, step, operation, and/or element, and do not exclude the existence of or a possibility of addition of one or more other components, steps, operations, and/or elements.

FIG. 1 is a perspective view schematically illustrating a display device according to one or more embodiments of the present disclosure. Referring to FIG. 1, a display device 1000 includes a first substrate 110, a light source 120, a first resin layer 130, a color filter layer 220, and a second substrate 210. The resin layers described herein may be referred to herein as a "low refractive-index" resin layers, as the resin layers have a relatively low refractive index, as will be discussed in further detail herein.

The light source 120 is disposed on at least one surface of the first substrate 110, which may be a side surface of the first substrate 110, as shown. FIG. 1 illustrates a configuration in which the light source 120 is arranged to be in contact with one surface of the first substrate 110. However, embodiments of the present disclosure are not limited thereto, and one or more embodiments may include a configuration in which the light source 120 is arranged to correspond to one surface of the first substrate 110 and to be spaced apart from the first substrate 110. That is, the light source 120 may be adjacent to a surface of the first substrate 110, and may or may not be in physical contact with the first substrate 110.

In one or more embodiments, the light source 120 may be a point light source, such as a Light-Emitting Diode (LED) that emits white light; however, embodiments of the present disclosure are not limited thereto. In addition, one or more light sources 120 may be included in the display device 1000 and arranged on a surface of the first substrate 110, depending on the size of the first substrate 110. The light source 120 according to the present embodiments may include various components, including for example, a substrate, a light-emitting chip, and the like.

In addition, a display panel 200 is disposed on the upper surface of the first substrate 110. Here, the display panel 200 may be bonded with the backlight unit 100 through a polarizing layer (not illustrated). The first substrate 110, the light source 120 and the low-refractive index resin later 130 may be included in the backlight unit 100. Meanwhile, the display panel 200 according to the present embodiments may include a color filter layer 220 and a second substrate 210. In this case, the color filter layer may be interposed between the first substrate 110 and the second substrate 210.

The first substrate 110 can uniformly change an optical distribution of received light, such that light that is focused on a narrow area may be distributed over a wide area. The first substrate 110 may be made of any transparent material. In one or more embodiments, the first substrate 110 may be formed of glass.

Since the first substrate 110 is made of a transparent material, light transmissivity can be improved. Accordingly, when light emitted from the light source 120 is incident on a surface, such as a side surface, of the first substrate 110, the amount of light emitted toward the display panel 200 can be increased. That is, the light emitted from the light source 120 may be emitted toward the second substrate 210 through the first substrate 110.

Although not illustrated in FIG. 1, a plurality of transistors for driving a plurality of sub-pixels included in the display panel may be disposed on a surface of the second substrate 210 of the display panel 200.

In this way, the first substrate 110 may serve as a light guide plate, and may also serve as an upper or a lower substrate of the display panel 200. In other words, in a display device according to the present embodiments, the backlight unit 100 includes the light source 120, the first substrate 110, and the first low-refractive index resin layer 130, the display panel 200 includes the second substrate 210 and the color filter layer 220, and the backlight unit 100 and the display panel 200 may be bonded together through a polarizing layer (not illustrated). Accordingly, the thickness of the display device can be reduced as a separate light guide plate is not needed, since the first substrate 110 serves as both a substrate and a light guide plate in the display device 1000.

On the other hand, a conventional liquid crystal display device is provided with components, such as a display panel and a backlight unit. Specifically, the backlight unit includes components, such as a cover bottom, a reflection layer, a light source assembly, a light guide plate, a plurality of optical sheets, a guide panel, and a support main. Since the backlight unit includes a large number of components as described above, there are problems in that it is necessary to design and maintain mold mating performance between the respective components, and the degree of freedom of such a product is thus limited. In addition, since inherent thicknesses exist for respective components of the backlight unit, there is a problem in making the backlight unit slim.

Further, a conventional liquid crystal display panel generally includes both an upper substrate and a lower substrate. In addition, a color filter layer and a liquid crystal layer may be interposed between the upper substrate and the lower substrate. Since the liquid crystal display panel also includes a large number of components and inherent thicknesses exist for respective components, there is a limitation in making the display panel slim. Therefore, there is a problem in making a display device, which includes a display panel and a backlight unit, slim.

On the other hand, the display device according to the present embodiments can facilitate making a display device slim by simplifying the structures of the backlight unit and the display panel.

Figure 2:
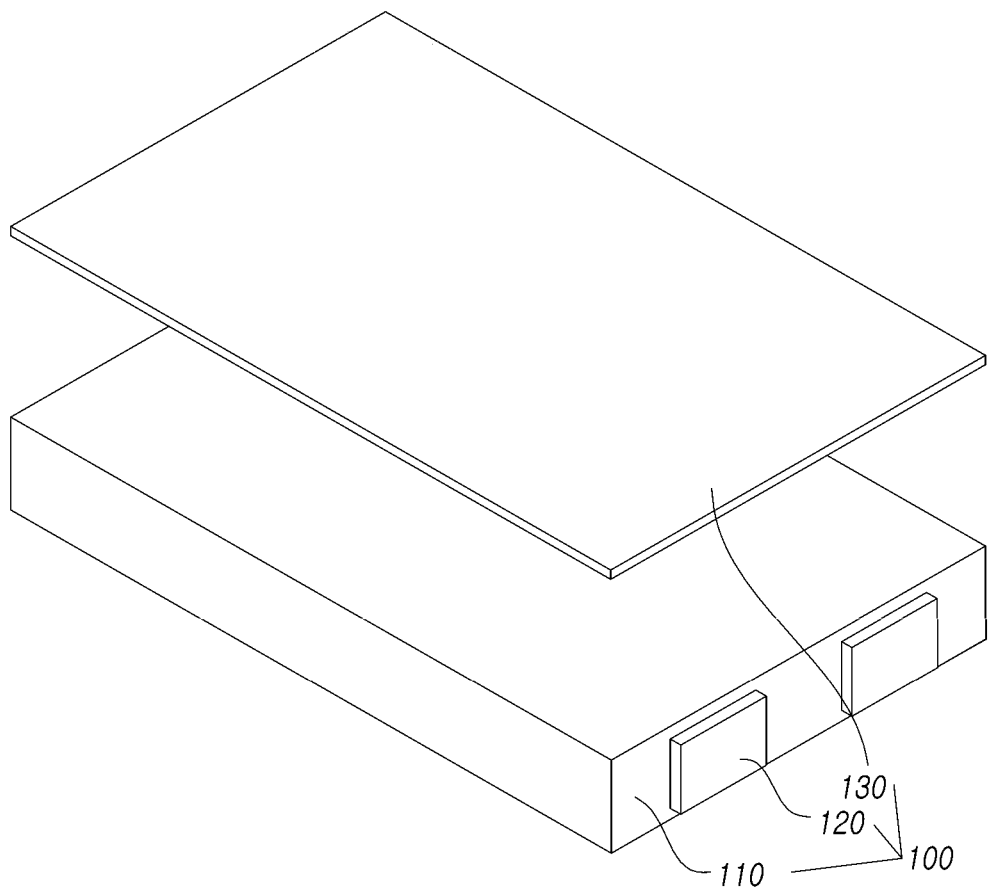
FIG. 2 is a perspective view illustrating a backlight unit according to a first embodiment.

FIG. 2 is a perspective view illustrating a backlight unit according to a first embodiment.

Referring to FIG. 2, the backlight unit 100 according to the first embodiment includes a first substrate 110, a light source 120, and a first low-refractive index resin layer 130. The first substrate 110 may be formed of glass. In addition, a light source 120 is disposed in a region corresponding to a surface of the first substrate 110, which may be a side surface of the first substrate 110, as shown in FIG. 2. One or more light sources 120 may be included in the backlight unit 100, as shown.

While FIG. 2 illustrates a configuration in which the light source 120 is disposed in a region corresponding to one side of the first substrate 110, the position of the light source 120 according to the present embodiments is not limited thereto. For example, the light sources 120 may be disposed in regions corresponding to two opposite side surfaces of the first substrate 110, and may be disposed in regions corresponding to the rear surface of the first substrate 110. However, in the following description, the configuration in which the light source 120 is disposed in a region corresponding to one side of the first substrate 110 will be described for the convenience of explanation.

In the backlight unit 100 according to the first embodiment, light emitted from the light source 120 is incident on a surface of the first substrate 110, such as a side surface as shown, and the light incident on the first substrate 110 is distributed by the first substrate 110 to be emitted to the front surface of the first substrate 110. In order to allow the light from the light source 120 that is incident on the surface of the first substrate 110 to be emitted to the front surface of the first substrate 110, a plurality of protrusions may be provided on at least one surface of the first substrate 110.

Figure 3:
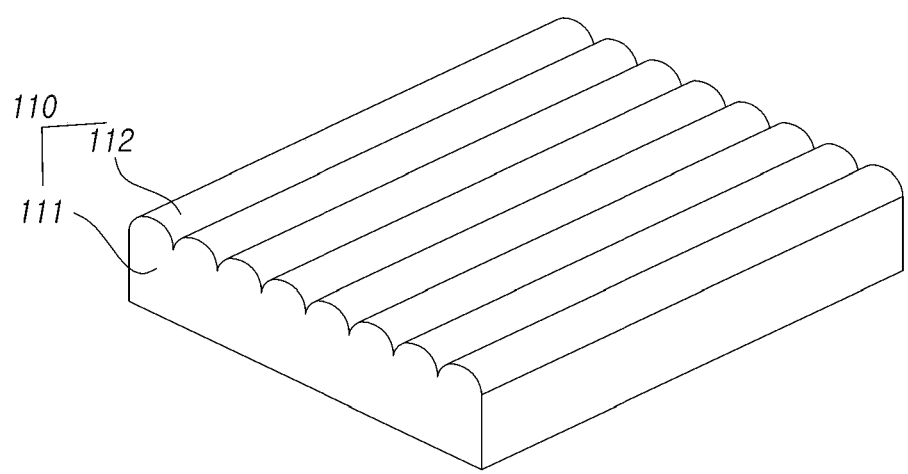
FIG. 3 is a perspective view illustrating a shape of a first substrate of the backlight unit according to the first embodiment.

This configuration will be described in further detail with reference to FIG. 3. FIG. 3 is a perspective view illustrating the shape of a first substrate of the backlight unit according to the first embodiment.

Referring to FIG. 3, the first substrate 110 of the backlight unit 100 according to the first embodiment includes a body 111 and a plurality of protrusions 112. Here, the plurality of protrusions 112 may be provided on at least one surface of the body 111. The plurality of protrusions 112 may be a part of the body 111.

Specifically, the first substrate 110 has a light-emitting surface, through which the light that is received from the light source is guided and emitted. The light-emitting surface of the first substrate 110 may be, for example, a front surface, which faces the display panel 200, as shown in FIG. 1. A plurality of protruding portions 112 may be provided on one or both of the light-emitting surface of the first substrate 110 and the opposite surface thereto, which may be, for example, a rear surface. Here, the light source 120 may be disposed on at least one surface of the first substrate 110, but is not disposed on the surface on which the plurality of protrusions 112 is provided.

For example, the light source 120 may be disposed on at least one side surface of the first substrate 110, and the plurality of protrusions 112 may be provided on the front surface of the first substrate 110. However, this configuration is merely one example for explaining the present embodiments, and the light source 120 and the plurality of protruding portions 112 may be arranged in various ways and on various surfaces of the first substrate 110, in accordance with embodiments of the present disclosure.

FIG. 3 illustrates an embodiment in which each of the plurality of protrusions 112 has a semi-circular shape in cross-section, but the shape of the plurality of protrusions 112 is not limited thereto. In various embodiments, the plurality of protrusions 112 may have any protruding shape, and may have, for example, a semi-elliptical or polygonal shape in cross-section.

The plurality of protrusions 112 may serve as an optical sheet. Specifically, the plurality of protrusions 112 may disperse the light incident on the first substrate 110, thereby preventing light from being partially concentrated and causing unevenness in an image displayed on the display panel, and refracts the light incident from the first substrate 110 at a right angle. In addition, the plurality of protrusions 112 may collect light, which is incident on the body 111 of the first substrate 110, to be uniformly distributed over the front surface of the display panel. Therefore, the backlight unit according to the present embodiment may eliminate the need for one or more optical sheets.

Figure 4:
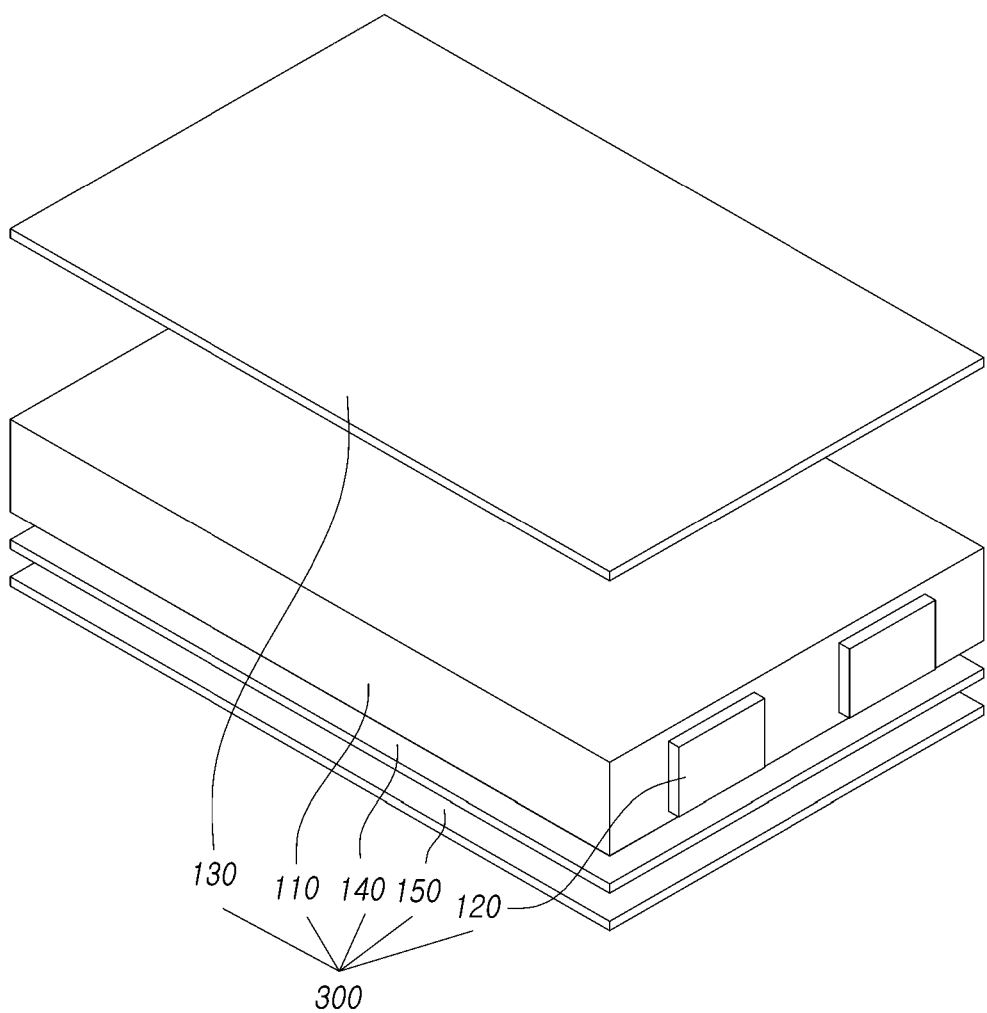
FIG. 4 is a perspective view illustrating a backlight unit according to a second embodiment.

Next, a backlight unit according to the second embodiment will be described with reference to FIG. 4. FIG. 4 is a perspective view illustrating a backlight unit according to the second embodiment. The backlight unit according to the second embodiment may include the same components as those of the above-described embodiments. The redundant description thereof will be omitted. Further, like reference numerals denote like components.

Referring to FIG. 4, the backlight unit 300 according to the second embodiment includes a first substrate 110, a light source 120, a first low-refractive index resin layer 130, a second low-refractive index resin layer 140, and a refractive layer 150.

A plurality of protrusions (not illustrated) is provided on one surface of the first substrate 110, and the light source 120 is disposed in a region corresponding to at least one surface of the remaining surfaces. That is, the light source 120 may be provided along any of the surfaces of the first substrate 110, except for the surface on which the plurality of protrusions is provided. In addition, the first low-refractive index resin layer 130 is disposed on the upper surface of the first substrate 110. In addition, the second low-refractive index resin layer 140 may be disposed on the rear surface of the first substrate 110, and the reflective layer 150 may be disposed on the rear surface of the second low-refractive index resin layer 140.

Here, the reflective layer 150 may serve to reflect light, which is not directed toward the front surface of the first substrate 110 but is directed toward the rear surface of the first substrate 110, to be directed toward the front surface, again. In addition, the refractive indexes of the first and second low-refractive index resin layers 130 and 140 may be within a range from 1 to 1.41, inclusive, and the refractive index of the first substrate 110 may be within a range from 1.45 to 1.65, inclusive. Accordingly, both the first and the second low-refractive index resin layers 130, 140 have an index of refraction that is less than an index of refraction of the first substrate 110.

When the refractive indexes of the first and second low-refractive index resin layers 130 and 140 are less than the refractive index of the first substrate 110 as described above, it is possible to prevent the light from leaking out to the outside of the first substrate 110 without being guided through the first substrate 110 and emitted from the light-emitting surface of the first substrate 110.

Specifically, a part of the light incident on the first substrate 110 from the light source 120 may be emitted toward the display panel immediately after being incident on the first substrate 110. In addition, due to the lower refractive indexes of the first and second low-refractive index resin layers 130 and 140, a part of the light incident on the first substrate 110 from the light source 120 may be totally reflected from the interfaces between the first and second low-refractive index resin layers 130 and 140 and the first substrate 110. The light, which has been totally reflected from the interface between the first low-refractive index resin layer 130 and the first substrate 110 and the interface between the second low-refractive index resin layer 140 and the first substrate 110, may be emitted toward the display panel while advancing inside the first substrate 110.

At this time, a plurality of protrusions (not illustrated) may be provided on the front surface of the first substrate 110 so as to condense light and to cause the light to be uniformly distributed over the front surface of the display panel (not illustrated).

As described above, the backlight unit 300 of the display device may include the first substrate 110, the light source 120, the first low-refractive index resin layer 130, the second low-refractive index resin layer 140, and the reflective layer 150, so that the structure of the backlight unit 300 can be simplified. For example, the backlight unit 300 does not require a separate light guide plate or optical sheets.

Next, the structure of the display panel disposed on the backlight unit 300 will be described in detail.

Figure 5:
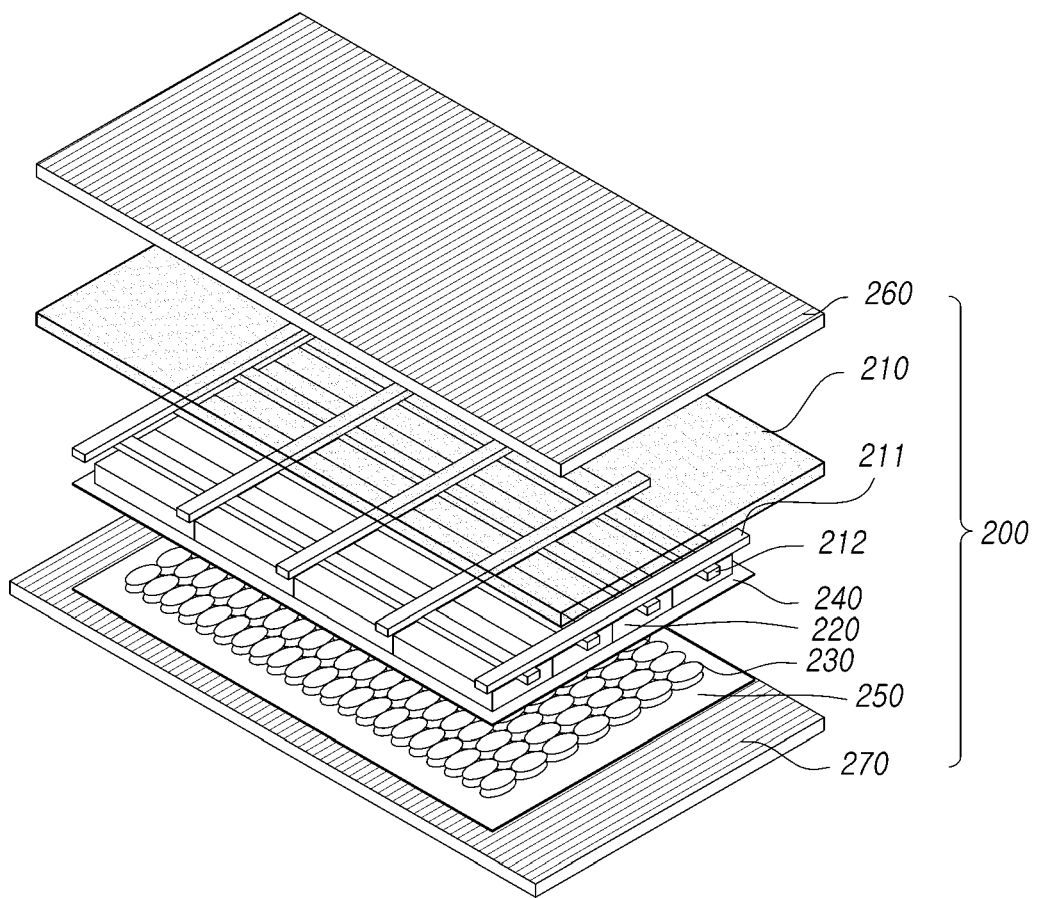
FIG. 5 is a perspective view schematically illustrating a display panel of the display device according to one or more embodiments.

FIG. 5 is a perspective view schematically illustrating a display panel of the display device according to the present embodiments. The display panel illustrated in FIG. 5 may include the same components as those of the above-described embodiment. A description overlapping with that of the above-described embodiment may be omitted. Further, similar components will be denoted by the same reference numerals.

Referring to FIG. 5, the display panel 200 of the display device according to the present embodiments includes a first polarizing layer 270, a first alignment film 250, a liquid crystal layer 230, a second alignment film 240, a color filter layer 220, a second substrate 210, and a second polarizing layer 260.

Specifically, in the display panel 200, the first alignment film 250 and the second alignment film 240 are disposed on the first polarizing layer 270, and the liquid crystal layer 230 is disposed between the first alignment layer 250 and the second alignment layer 240. In addition, the color filter layer 220 is disposed on the second alignment film 240. Further, the second substrate 210 is disposed on the color filter layer 220, and the second polarizing layer 260 is disposed on the second substrate 210.

The first polarizing layer 270 may include an adhesive material and a plurality of nanowires. The plurality of nanowires may be dispersed in the adhesive material. Here, the plurality of nanowires may be made of any one of aluminum (Al), titanium (Ti), chromium (Cr), silver (Ag), nickel (Ni), a nickel-chromium alloy, and gold (Au), but the material of the nanowires according to the present embodiments is not limited thereto.

When the first polarizing layer 270 includes an adhesive material and a plurality of nanowires as described above, the first polarizing layer 270 can be easily bonded to other components and can polarize visible light in a wavelength range of about 400 nm to 800 nm.

The first alignment film 250, the liquid crystal layer 230, and the second alignment film 240 are disposed on the first polarizing layer 270. Here, the first alignment film 250 and the second alignment film 240 can align a plurality of liquid crystal molecules disposed in the liquid crystal layer 230 in a predetermined direction.

The color filter layer 220 is disposed on the second alignment film 240. The color filter layer 220 may include a plurality of red (R) color filters, green (G) color filters, and blue (B) color filters, or may include a plurality of red (R) color filters, green (G) color filters, blue (B) color filters, and white (W) color filters. However, no color filter may be disposed in the region where the white (W) color filter is disposed. The wavelength of light incident from the backlight unit (not illustrated) may be converted into a desired wavelength of light, which matches each sub-pixel, while passing through the color filter layer.

The second substrate 210 is disposed on the color filter layer 220. A plurality of data lines 211 and a plurality of gate lines 212 are disposed on one surface of the second substrate 210. The plurality of data lines 211 and the plurality of gate lines 212 may be arranged to intersect each other, and sub-pixels may be defined at intersecting regions. Each sub-pixel may correspond to a region in which one color filter of the color filter layer 220 is disposed.

The second polarizing layer 260 is disposed on the second substrate 210. The second polarizing layer 260 may have the same configuration as the first polarizing layer, or may be configured to include a film, an adhesive layer, and a polarizer. The first polarizing layer 270 and the second polarizing layer 260 have the effect of improving the visibility of the display panel.

Since the display panel according to the present embodiments has a configuration in which at least one substrate is removed compared with the conventional display panel, the structure of the display panel can be simplified and slimmed.

Figure 6:
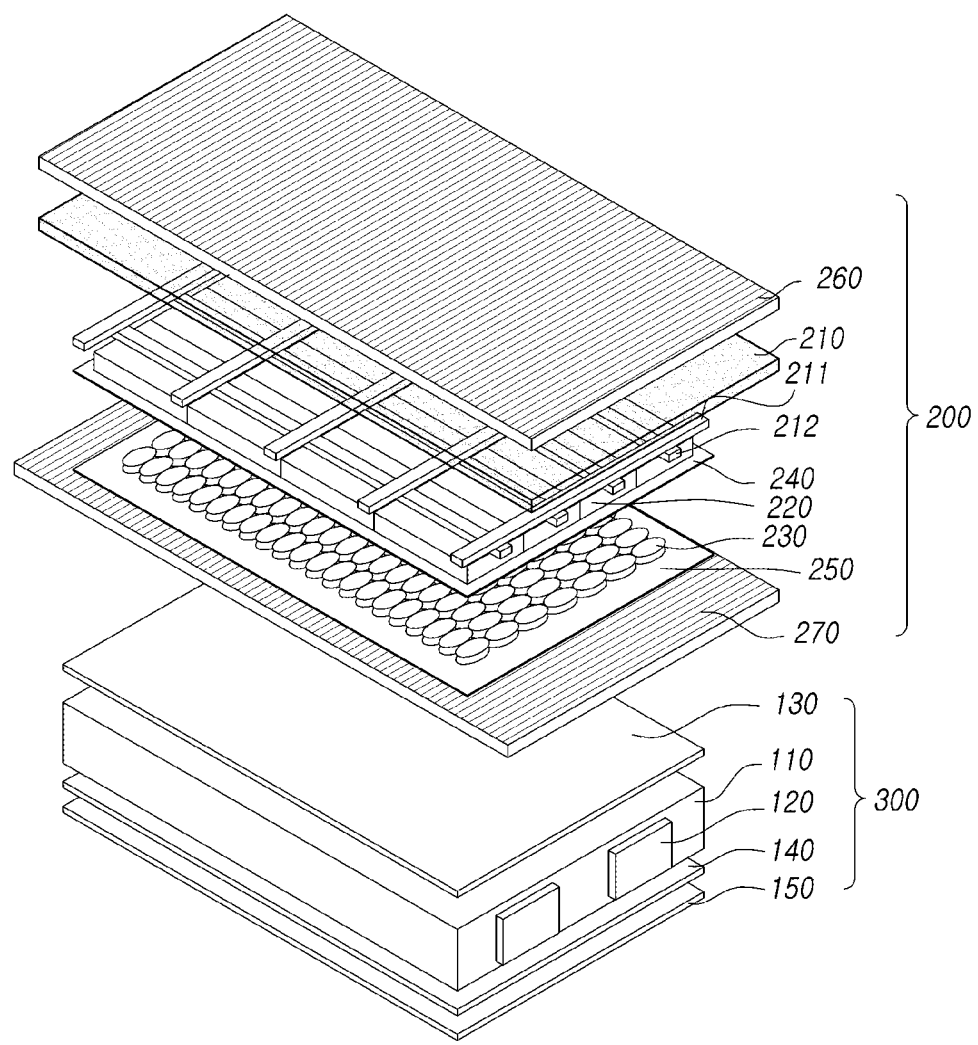
FIG. 6 is a perspective view illustrating a display device in which a backlight unit and a display panel are bonded to each other according to one or more embodiments.

When the backlight unit and the display panel illustrated in FIGS. 4 and 5 are bonded to each other, the display device according to the present embodiments can be constituted. Referring to FIG. 6, the display device according to the present embodiment will be described in detail below.

FIG. 6 is a perspective view illustrating a display device in which a backlight unit and a display panel according to the present embodiments are bonded to each other. The display device illustrated in FIG. 6 may include the same components as those of the above-described embodiment. A description overlapping with that of the above-described embodiments may be omitted. Further, similar components will be denoted by the same reference numerals.

Referring to FIG. 6, in a display device 1100 in which a backlight unit 300 and a display panel 200 according to the present embodiment are bonded to each other, the backlight unit 300 and the display panel 200 may be bonded to each other through a first polarizing layer 270.

The backlight unit 300 includes a first substrate 110, a light source 120, a first low-refractive index resin layer 130, a second low-refractive index resin layer 140, and a refractive layer 150. In addition, the display panel 200 includes a first polarizing layer 270, a first alignment film 250, a liquid crystal layer 230, a second alignment film 240, a color filter layer 220, a second substrate 210, and a second polarizing layer 260.

Here, the first and second low-refractive index resin layer 130 and 140 may have a refractive index within a range from 1 to 1.41, inclusive. At this time, when the refractive indexes of the first and second low-refractive index resin layers 130 and 140 are from 1 to 1.41 as described above, it is possible to prevent the light from leaking out to the outside of the first substrate 110 without being guided through the first substrate 110 and emitted through the light-emitting surface of the first substrate 110.

Specifically, the first substrate 110, which has a refractive index higher than those of the first and second low-refractive index resin layers 130 and 140, is disposed between the first and second low-refractive index resin layers 130 and 140. In this structure, light generated from the light source 120 advances in parallel to a first direction (optical axis direction) while being totally reflected into the first substrate 110 when viewed from above the first substrate 110.

On the other hand, when a structure having a refractive index, which is higher than or similar to the refractive index of the first substrate 110 is disposed on each of the top and bottom of the first substrate 110, the light may leak out to the outside of the first substrate 110 without being guided through the first substrate 110. That is, there is a problem in that the backlight unit has a very large radiation angle and the amount of light finally incident on the display panel 200 becomes small.

On the other hand, when the display device 1100 according to the present embodiment has a structure in which the first substrate 110 is disposed between the first and second low-refractive index resin layer 130 and 140, which have a refractive index less than that of the first substrate 110, it is possible to reduce the amount of light leaking out to the outside of the first substrate 110 from a light entry portion.

Specifically, the light generated from the light source 120 and emitted into the first substrate 110, e.g., into a side surface of the first substrate 110, may be totally reflected within the first substrate 110 at the boundary between the first substrate 110 and the first low-refractive index resin layer 130 and at the boundary between the first substrate 110 and the second low-refractive index resin layer 140 so that the path of the light is changed again toward the inside of the first substrate 110, and by repeating this process, the light advances in parallel with the first direction (optical axis direction).

That is, light emitted by the light source may be guided through the first substrate 110, and the guided light may be emitted in a second direction (toward the display panel) that is a direction intersecting the first direction, and may be perpendicular to the first direction. In other words, the light incident on the first substrate 110 is incident on the first substrate 110 and then is emitted in the second direction, or may be emitted in the second direction while advancing parallel to the bottom surface of the first substrate 110.

Meanwhile, the first and second low-refractive index resin layers 130 and 140 may be made of a transparent organic material. For example, the first and second low-refractive index resin layers 130 and layer 140 may be made of an optical clear adhesive or an optical clear resin.

When the first and second low-refractive index resin layers 130 and 140 are made of a transparent organic material, the light absorption amount is small while light is totally reflected from the boundary between the first substrate 110 and the first low-refractive index resin layer 130 and the boundary between the first substrate 110 and the second low-refractive index resin layer 140, so that it is possible to prevent the light efficiency from being lowered.

The first polarizing layer 270 of the display panel 200 is disposed on the first low-refractive index resin layer 130. At this time, the first polarizing layer 270 may include an adhesive material and a plurality of nanowires. When the first polarizing layer 270 includes an adhesive material and a plurality of nanowires as described above, visible light disposed below the first polarizing layer 270 and having a wavelength range of about 400 nm to 800 nm can be polarized. The first polarizing layer 270 may serve to bond the display panel 200 and the backlight unit 300 to each other and functions as a polarizing plate.

Here, the refractive index of the adhesive material of the first polarizing layer 270 may be the same as the refractive index of the first low-refractive index resin layer 130. Specifically, the refractive index of the adhesive material of the first polarizing layer 270 may be within a range from 1 to 1.41, inclusive. At this time, when the refractive index of the adhesive material of the first polarizing layer 270 is the same as that of the first low-refractive index resin layer 130, the light, which enters the display panel 200 through the first low-refractive index resin layer 130, may pass through the first polarizing layer 270 without loss.

The first alignment film 250 is disposed on the first polarizing layer 270, the liquid crystal layer 230 is disposed on the first alignment film 250, and the second alignment layer 240 is disposed on the liquid crystal layer 230. In addition, the color filter layer 220 is disposed on the second alignment film 240. Further, a second substrate 210 having a plurality of data lines 211 and a plurality of gate lines 212 is disposed on the color filter layer 220. The second polarizing layer 260 is disposed on the second substrate 210. Although FIG. 6 illustrates a configuration in which the color filter layer 220 is disposed between the second alignment film 240 and the second substrate 210, the position of the color filter layer 220 is not limited thereto. For example, the color filter layer 220 may be disposed between the first polarizing layer 270 and the first alignment film 250.

In addition, although FIG. 6 illustrates a configuration in which a plurality of data lines 211 and a plurality of gate lines 212 are provided on the second substrate 210, this is merely an example, and the positions of the plurality of data lines 211 and the plurality of gate lines 212 are not limited thereto.

Meanwhile, the thickness of the second substrate 210 may be less than the thickness of the first substrate 110. Specifically, when the first substrate 110 serves to guide light emitted from the light source 120, the first substrate 110 may be made thicker than the second substrate 210.

In addition, the first substrate 110 may serve to guide the light emitted from the light source 120, and may function as an upper or a lower substrate of the display panel 200. That is, the display device 1100 according to the present embodiment has the effect of reducing the thickness of the display device 1100 by removing at least one substrate of the light guide plate or the display panel and removing a plurality of optical sheets. In other words, when the first substrate 110 serves as the substrate of the display panel 200 and as the light guide plate of the backlight unit 300 at the same time, it is possible to simplify the structure of the display device 1100. In addition, since the plurality of protrusions provided on one surface of the first substrate 110 and the first and second low-refractive index resin layers 130 and 140 emit light incident from the light source toward the display panel 200, it is possible to remove a configuration of optical sheets.

Specifically, the plurality of protrusions disperses the light incident on the first substrate 110, and the light incident on the first substrate 110 may be condensed and uniformly distributed over the front surface of the display panel. In addition, the first and second low-refractive index resin layers 130 and 140 can reduce the amount of light leaking out from a light entry portion to the outside of the first substrate 110. Since the first substrate 110 of the display device 1100 includes a plurality of protrusions and the backlight unit 300 includes the first and second low-refractive index resin layers 130 and 140, no separate optical sheet is needed, and as a result, the configuration of the display device can be simplified.

In addition, although not illustrated in the drawings, the display device 1100 according to the present embodiment may further include a cover member that encloses the backlight unit 300 and the display panel 200.

Figure 7:
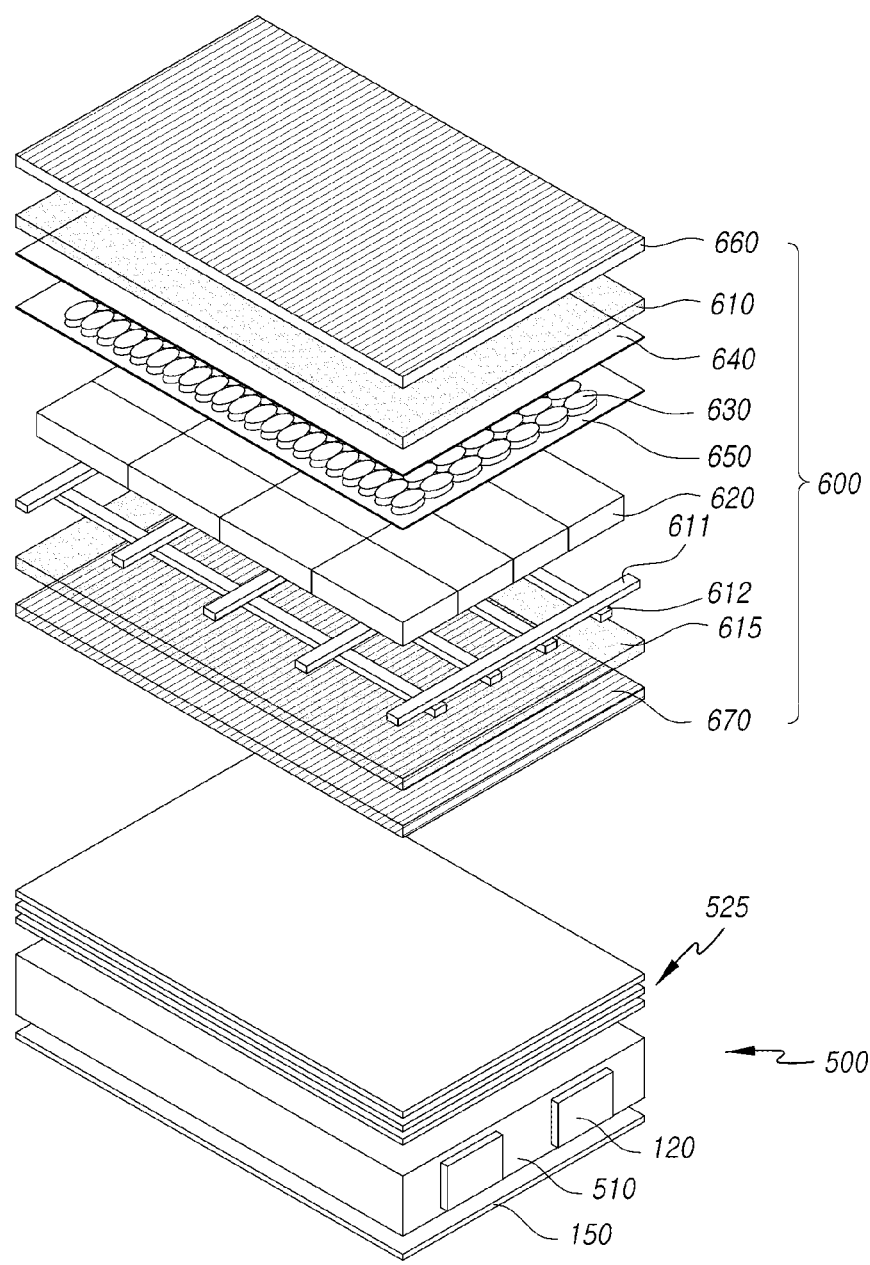
FIG. 7 is a view illustrating a display device according to a comparative example.

Next, a display device according to a comparative example will be described with reference to FIG. 7. FIG. 7 is a view illustrating a display device according to a comparative example. The display device according to the comparative example may include the same components as those of the above-described embodiments. A description overlapping with that of the above-described embodiments may be omitted. Further, like reference numerals denote like components.

Referring to FIG. 7, the display device according to a comparative example includes a backlight unit 500 and a display panel 600.

Specifically, the backlight unit 500 of the display device according to the comparative example includes a light source 120, a light guide plate 510, a reflective layer 150, and a plurality of optical sheets 525. In addition, the display panel 600 of the display device according to the comparative example includes a lower polarizing plate 670, a lower substrate 615, a color filter layer 620, a first alignment film 650, a liquid crystal layer 630, a second alignment film 640, an upper substrate 610, and an upper polarizing plate 660.

Here, a plurality of data lines 611 and a plurality of gate lines 612 are disposed on the lower substrate 615, and sub-pixels may be defined in the regions where the data lines 611 and the gate lines 612 cross each other.

On the other hand, the display device according to the comparative example may further include the plurality of optical sheets 525, the light guide plate 510, and the upper and lower substrates 610 and 615 compared with the display device according to the present embodiments. That is, the display device according to the present embodiments does not include the plurality of optical sheets 525, the light guide plate 510, or the upper and lower substrates 610 and 615 compared with the display device according to the comparative example, so that the thickness of the display device can be reduced in accordance with the present embodiments.

In addition, while the first and second polarizing plates 670 and 660 including a polarizing film and a polarizer are used in the display device according to the comparative example, the display device according to the present embodiment is configured in such a manner that at least one polarizing layer includes an adhesive member and a plurality of nanowires. As a result, the thickness of the display device can be reduced.

In addition, while the display panel according to the comparative example has a configuration in which a lower polarizing plate 670, a lower substrate 615, a color filter layer 620, a first alignment layer 650, a liquid crystal layer 630, a second alignment layer 640, an upper substrate 610, and an upper polarizing plate 660 are stacked in this order, the display panel according to the present embodiment has a configuration in which a first alignment layer 250, a liquid crystal layer 230, a second alignment layer 240, a color filter layer 220, a second substrate 210, and a second polarizing plate 260 are stacked in this order. Therefore, it can be seen that there is a difference in the stacked structures.

Figure 8:
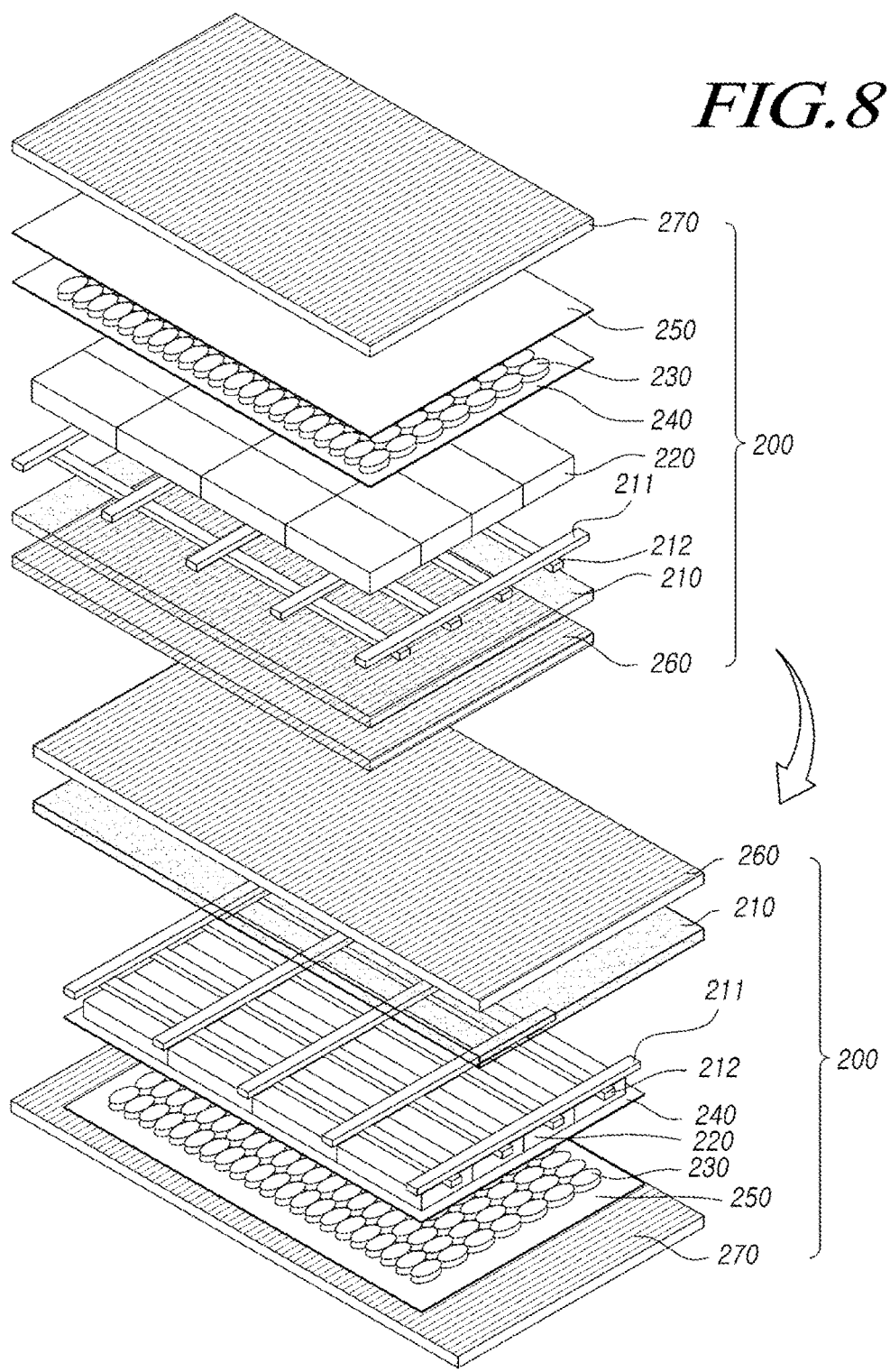
FIGS. 8 to 10 are views schematically illustrating a method of manufacturing a display device according to one or more embodiments.
Figure 9:
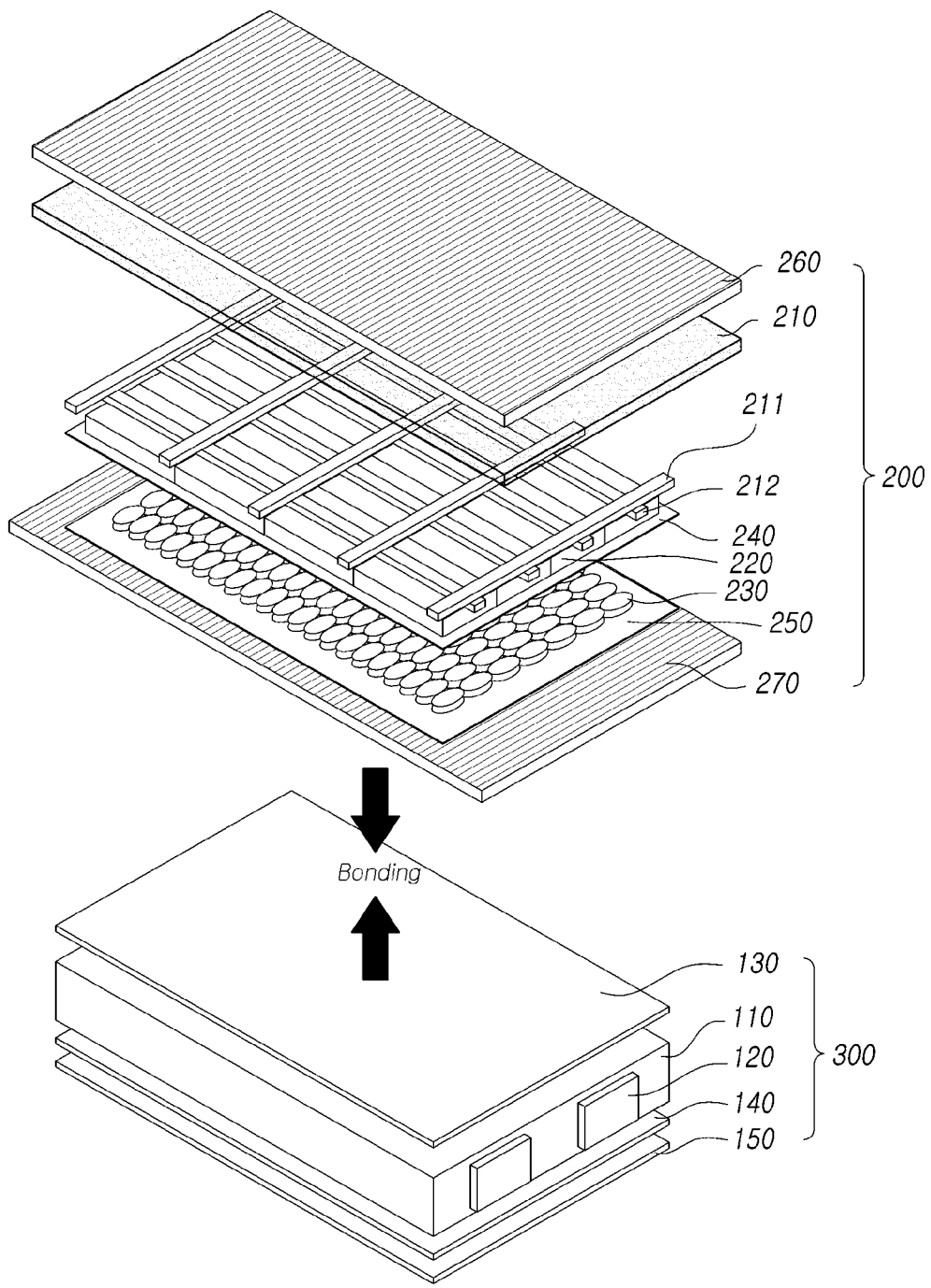
Figure 10:
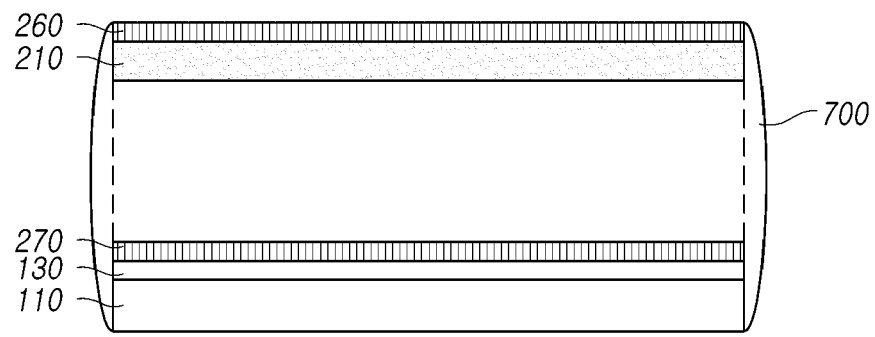

Next, a method of manufacturing a display device according to the present embodiments will be described with reference to FIGS. 8 to 10. FIGS. 8 to 10 are views schematically illustrating a method of manufacturing a display device according to the present embodiments. The display device illustrated in FIGS. 8 to 10 may include the same components as those of the above-described embodiments. A description overlapping with that of the above-described embodiments may be omitted. Further, similar components will be denoted by the same reference numerals.

First, referring to FIG. 8, a plurality of data lines 211 and a plurality of gate lines 212 are disposed on a second substrate 210 of the display panel 200 according to the present embodiments. A color filter layer 220 is disposed on the second substrate 210 on which the plurality of data lines 211 and the plurality of gate lines 212 are disposed. In addition, a second alignment layer 240 and a first alignment layer 250 are disposed on the color filter layer 220. In addition, a first polarizing layer 270 is disposed on the first alignment layer 250. Further, a second polarizing layer 260 may be attached to one surface of the second substrate 210. In this way, the display panel 200 according to the present embodiment can be manufactured.

Thereafter, the manufactured display panel 200 is turned upside down, as shown by the arrow in FIG. 8. That is, the manufactured display panel 200 is reversed.

Meanwhile, referring to FIG. 9, the backlight unit 300 according to the present embodiment includes a light source 120 disposed on one side of the first substrate 110. In addition, a first low-refractive index resin layer 130 and a second low-refractive index resin layer 140 are disposed on the upper and lower surfaces of the first substrate 110, respectively, which may be front and rear surfaces. In addition, a reflective layer 150 is disposed on the rear surface of the second low-refractive index resin layer 140.

The backlight unit 300 prepared in this manner and the display panel 200, which has been turned upside down, are bonded to each other, as shown in FIG. 9. At this time, the first polarizing layer 270 of the display panel 200 includes an adhesive member, so that the display panel 200 and the backlight unit 300 can be bonded to each other via the first polarizing layer 270.

Referring to FIG. 10, which is a cross-sectional view showing some of the components of the backlight unit 300 and display panel 200 after bonding, a sealing material 700 is formed over side surfaces of the first substrate 110 and extends to and over side surfaces of the second substrate 210, as shown. Then, a liquid crystal layer 230 is formed by injecting liquid crystal material into a space between the first substrate 110 and the second substrate 210. Specifically, the liquid crystal layer 230 is formed between the first alignment layer 250 and the second alignment layer 240. Here, the sealing material 700 can prevent the liquid crystal of the liquid crystal layer 230 from leaking out.

After the backlight unit 300 and the display panel 200 turned upside down and the liquid crystal are bonded to each other and liquid crystal is injected into the space between the first substrate 110 and the second substrate 210, a display device having the configuration as illustrated in FIG. 6 can be provided. As described above, by simplifying the configuration of the display device according to the present embodiment, the manufacturing method can also be simplified. Further, since the configuration is simple, there is an advantageous effect in maintaining and designing mold mating.

As described above, the display device according to the present embodiments does not include at least one substrate of the light guide plate or the display panel and a plurality of optical sheets, so that the thickness of the display device 1100 can be reduced. Further, since the display device according to the present embodiments has a simple structure, it is easy to maintain and design mold mating between respective components, and it is possible to improve the degree of freedom of the product. In addition, since the display device according to the present embodiments includes the first low refractive index layer 130 and the second low-refractive index layer 140 on the top and bottom of the first substrate 110, it is possible to increase the amount of light to be incident on the display panel.

Features, structures, and effects described in the above-described exemplary embodiments are included in at least one exemplary embodiment of the present disclosure, but are not limited to only one exemplary embodiment. Further, features, structures, and effects exemplified in each exemplary embodiment may be embodied by being combined with another exemplary embodiment or modified by those skilled in the art. It should be interpreted that the combined and modified contents are included in the scope of the present disclosure.

In the above description, the present disclosure has been described based on the exemplary embodiments, but the exemplary embodiments are for illustrative purpose, and do not limit the present disclosure, and those skilled in the art will appreciate that various modifications and applications, which are not exemplified in the above description, may be made without departing from the scope of the essential characteristic of the present exemplary embodiments. For example, each component described in detail in the embodiments can be modified. The differences related to such variations and applications should be construed to be included within the scope of the present disclosure as defined in the appended claims.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:
a first substrate formed of glass;
a light source disposed at a position that corresponds to at least one surface of the first substrate;
a first resin layer on a first surface of the first substrate;
a second resin layer directly on and in contact with a second surface of the first substrate, the second surface opposite the first surface;
a first polarizing layer on the first resin layer;
a liquid crystal layer on the first polarizing layer;
a second substrate on the liquid crystal layer, the second substrate including a plurality of data lines and a plurality of gate lines; and
a second polarizing layer on the second substrate,
wherein the first substrate serves as a light guide plate and an upper or a lower substrate of a display panel,
wherein the first substrate includes a body and a plurality of protrusions which protrudes directly from the body, the plurality of protrusions at least partially defining a light-emitting surface of the first substrate,
wherein the plurality of protrusions directly contacts the first resin layer and serves as an optical sheet.

2. The display device of claim 1, further comprising:
a reflective layer on the second resin layer.

3. The display device of claim 1, wherein each of the first and the second resin layers has a refractive index within a range of 1 to 1.41, inclusive.

4. The display device of claim 1, wherein the first polarizing layer includes an adhesive material and a plurality of nanowires.

5. The display device of claim 4, wherein the adhesive material has a refractive index within a range of 1 to 1.41, inclusive.

6. The display device of claim 1, further comprising:
a color filter layer between the second substrate and the liquid crystal layer.

7. The display device of claim 6, further comprising:
a first alignment film between the liquid crystal layer and the color filter layer; and
a second alignment film between the liquid crystal layer and the first polarizing layer.

8. The display device of claim 1, wherein the first substrate is thicker than the second substrate.

9. The display device of claim 1, wherein the first substrate receives light from the light source and guides the received light to a light-emitting surface of the first substrate.

10. The display device of claim 1, further including
a sealing material extending from a side surface of the first substrate to a corresponding side surface of the second substrate.

11. The display device of claim 1, wherein the first polarizing layer is directly on and in contact with the first resin layer.

12. A method of manufacturing a display device, the method comprising:
providing a first substrate formed of glass;
disposing a light source adjacent to at least one surface of the first substrate;
forming a first resin layer on a first surface of the first substrate; and
forming a second resin layer directly on and in contact with a second surface of the first substrate, the second surface opposite the first surface; and
attaching a display panel to the first resin layer,
wherein the display panel includes a second substrate on a liquid crystal layer,
wherein the first substrate serves as a light guide plate and an upper or a lower substrate of the display panel,
wherein the first substrate includes a body and a plurality of protrusions which protrudes directly from the body, the plurality of protrusions at least partially defining a light-emitting surface of the first substrate,
wherein the plurality of protrusions directly contacts the first resin layer and serves as an optical sheet.

13. The method of claim 12, further comprising:
forming the display panel, by:
forming a plurality of data lines and a plurality of gate lines on a second substrate;
forming a color filter layer on the second substrate; and
forming a polarizing layer including an adhesive member on the color filter layer.

14. The method of claim 12, wherein the attaching the display panel to the first resin layer includes attaching a polarizing layer of the display panel to the first resin layer, the polarizing layer being in contact with the first resin layer.

15. A display device, comprising:
a first substrate of a transparent material, the first substrate having a light-emitting surface and a plurality of side surfaces;
a light source positioned adjacent to at least one of the side surfaces of the first substrate;
a first resin layer on the light-emitting surface of the first substrate;
a second resin layer directly on and in contact with a surface of the first substrate that is opposite to the light-emitting surface, each of the first and the second resin layers having an index of refraction that is less than an index of refraction of the first substrate;
a first polarizing layer on the first resin layer;
a second substrate;
a liquid crystal layer between the first polarizing layer and the second substrate; and
a second polarizing layer on the second substrate,
wherein the first substrate serves as a light guide plate and an upper or a lower substrate of a display panel,
wherein the light-emitting surface of the first substrate includes a plurality of protrusions which protrudes directly from a body portion of the first substrate,
wherein the plurality of protrusions directly contacts the first resin layer and serves as an optical sheet.

16. The display device of claim 15, wherein the index of refraction of the first and the second resin layers are within a range of 1 to 1.41, inclusive, and the index of refraction of the first substrate is within a range of 1.45 to 1.65, inclusive.

17. The display device of claim 15, wherein the first polarizing layer is directly on and in contact with the first resin layer.

* * * * *